United States Patent [19]

Matsunami et al.

[11] Patent Number: 5,022,725

[45] Date of Patent: Jun. 11, 1991

[54] OPTICAL SENSOR

[75] Inventors: Takao Matsunami, Hirakata; Hidenori Okuda, Shiga, both of Japan

[73] Assignee: Matsushita Electric Industrial Co., Ltd., Osaka, Japan

[21] Appl. No.: 423,087

[22] Filed: Oct. 18, 1989

[30] Foreign Application Priority Data

Oct. 21, 1988 [JP] Japan ................................. 63-266389

[51] Int. Cl.$^5$ ............................................. G02B 17/00
[52] U.S. Cl. ...................................... 350/1.4; 350/442; 350/502; 250/216
[58] Field of Search ................ 350/1.4, 442, 444, 445, 350/446, 502; 250/216

[56] References Cited

U.S. PATENT DOCUMENTS

| | | | |
|---|---|---|---|
| 3,825,747 | 7/1974 | Thomson | 250/216 |
| 4,055,761 | 10/1977 | Shimomura | 250/216 |
| 4,554,448 | 11/1985 | Sillitto | 350/442 |
| 4,880,974 | 11/1989 | Yamakawa | 250/216 |

*Primary Examiner*—Bruce Y. Arnold
*Assistant Examiner*—J. D. Ryan
*Attorney, Agent, or Firm*—Panitch Schwarze Jacobs & Nadel

[57] ABSTRACT

An optical sensor comprising a light detector, a converging lens located between the light detector and a light source, the light rays from which are detected by the light detector, and a light shielding means provided on a part of the converging lens, the shielding means shielding light rays emitted from the light source, thereby reducing dependence of the amount of light rays to be detected upon angles of incidence with which the light rays enter into the converging lens of the optical sensor.

4 Claims, 11 Drawing Sheets

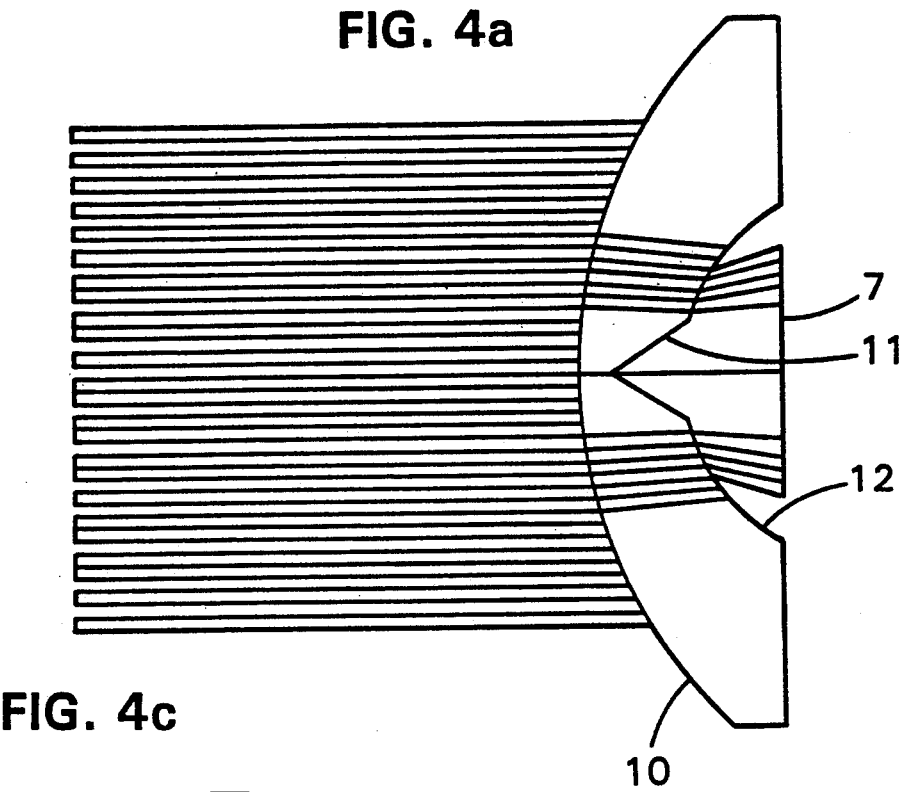
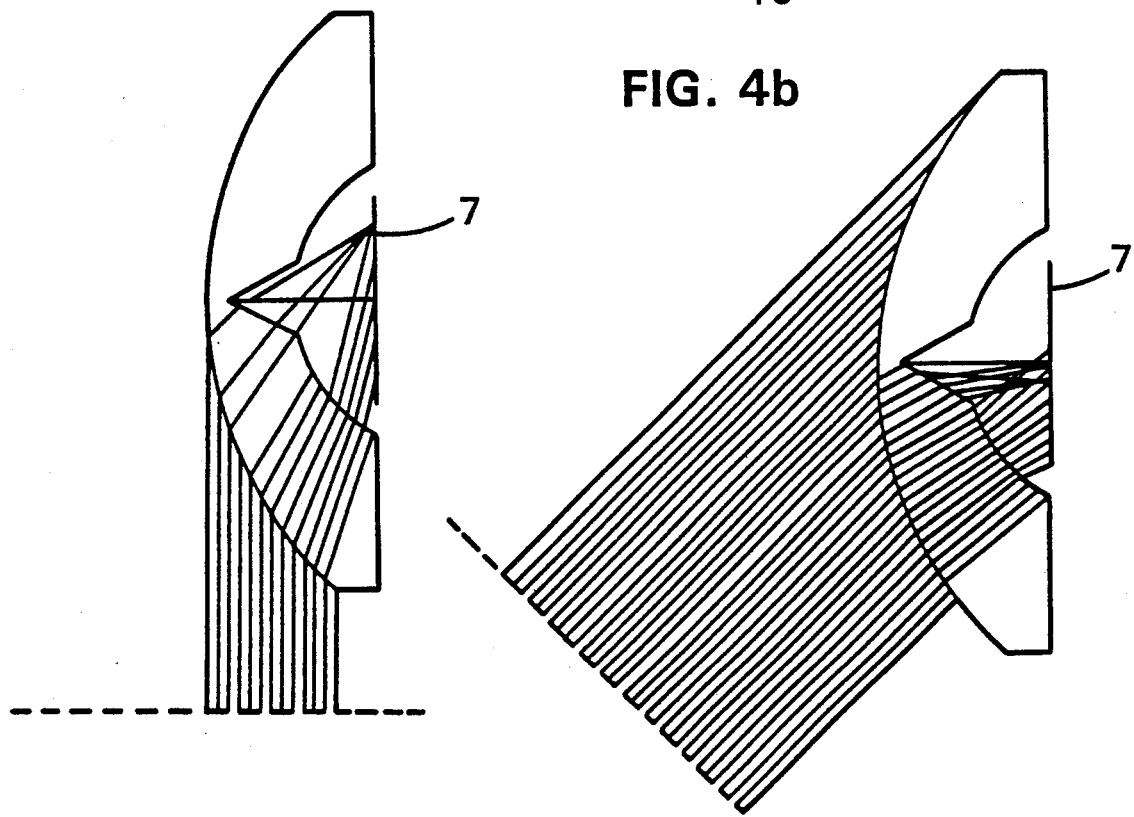

OPTICAL SENSOR

BACKGROUND OF THE INVENTION

1. Field of the Invention

The present invention relates to an optical sensor which senses visible or infrared radiation and is used to control the operation of various devices or to measure the environment.

2. Description of the Prior Art

A conventional optical sensor of this kind has been described in Japanese Laid-Open Patent Publication No. 62-261025, which comprises, as shown in FIG. 14, a converging lens 1, a light detector 2, a transmitting window 3, and an optical sensor element 4. The converging lens 1 causes a light ray incident at right angles onto the light detector 2 to transmit therethrough without refraction and causes a light ray incident onto the light detector 2 at great angles of incidence to refract greatly, to thereby collect light rays from all directions onto the light detector 2.

In a constitution such as that mentioned above, most of the light rays incident at right angles onto the transmitting window 3 are detected. On the other hand, light rays incident in a horizontal direction onto the transmitting window 3 are refracted by the converging lens 1 and only a part of the light rays reaches the transmitting window 3. FIG. 15 shows the change in the amount of light detected with the angles of incidence at the time when the amount of the light to be radiated is maintained at a fixed level. Given that the amount of light to be detected on the optical axis of the converging lens (i.e., at the angles of incidence of zero degrees) is 100, when the angles of incidence are 90 degrees, that is, light rays are incident upon the converging lens 1 in the horizontal direction toward the transmitting window 3, the amount of light to be detected becomes zero. In this way, in the case that a conventional concave lens formed of a spherical surface is used as a converging lens, the amount of light to be detected is highly dependent upon the angles of incidence, which causes difficulties in accurate measurement of light amounts.

SUMMARY OF THE INVENTION

The optical sensor of this invention, which overcomes the above-discussed and numerous other disadvantages and deficiencies of the prior art, comprises a light detector, a converging lens located between said light detector and a light source, the light rays from which are detected by said light detector, and a light shielding means provided on a part of the converging lens, said shielding means shielding light rays emitted from said light source.

In a preferred embodiment, a part of the converging lens has a total reflection surface which totally reflects light rays incident thereupon.

In a preferred embodiment, a total reflection surface or shielding section that shields light rays alone entering into said converging lens with specific angles of incidence is disposed in a part of said converging lens.

Alternatively, the optical sensor of this invention comprises a light detector, a converging lens located between said light detector and a light source, the light rays from which are detected by said light detector, and a total reflection surface which totally reflects light rays thereupon, said total reflection surface being disposed in a part of said converging lens.

Alternatively, the optical sensor of this invention comprises a light detector, a converging lens located between said light detector and a light source, the light rays from which are detected by said light detector, and a cylindrical surface which is substantially parallel to the optical axis of said converging lens, said cylindrical surface being disposed in a part of said converging lens.

Thus, the invention described herein makes possible the objective of providing an optical sensor that has less dependence of the amount of light rays to be detected upon angles of incidence with which the light rays enter into the converging lens of the optical sensor.

BRIEF DESCRIPTION OF THE DRAWINGS

This invention may be better understood and its numerous objects and advantages will become apparent to those skilled in the art by reference to the accompanying drawings as follows:

FIGS. 4a to 4c are diagrams showing the state of light rays incident upon the converging lens of the optical sensor shown in FIG. 3.

DESCRIPTION OF THE PREFERRED EMBODIMENTS

EXAMPLE 1

Figure 1:
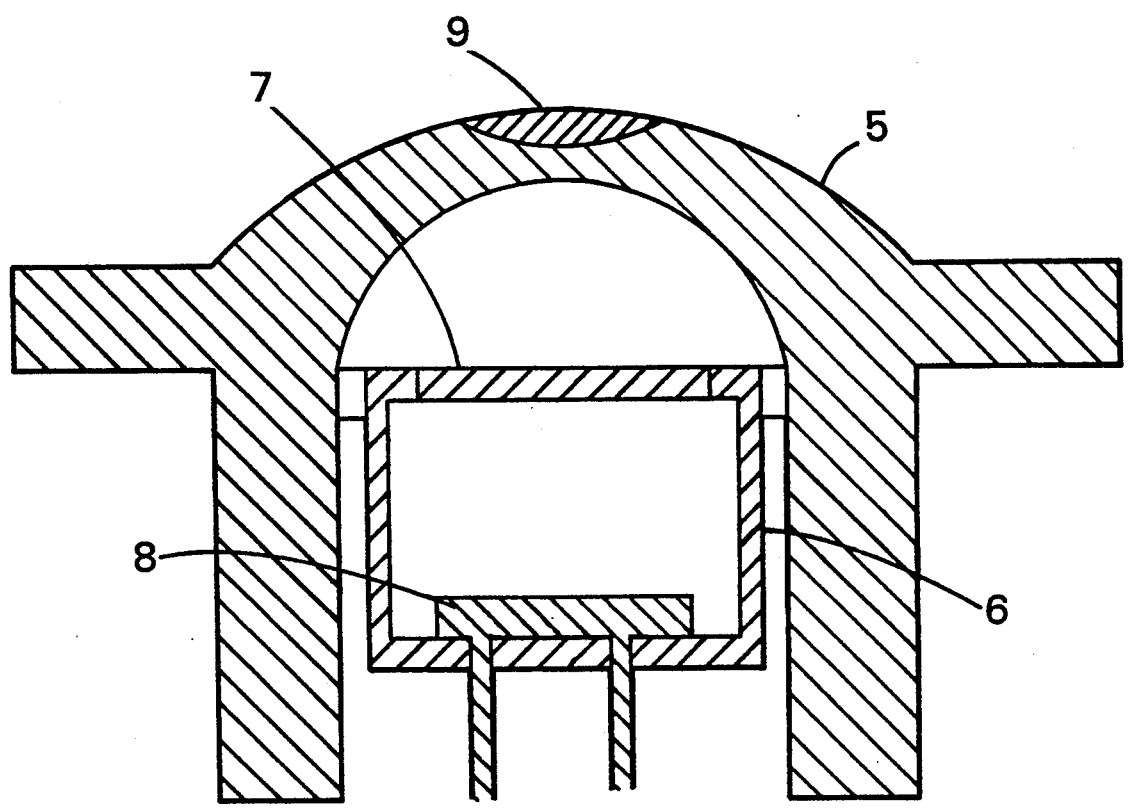
FIG. 1 is a cross sectional view showing the optical sensor of a first embodiment of this invention.
Figure 2A:
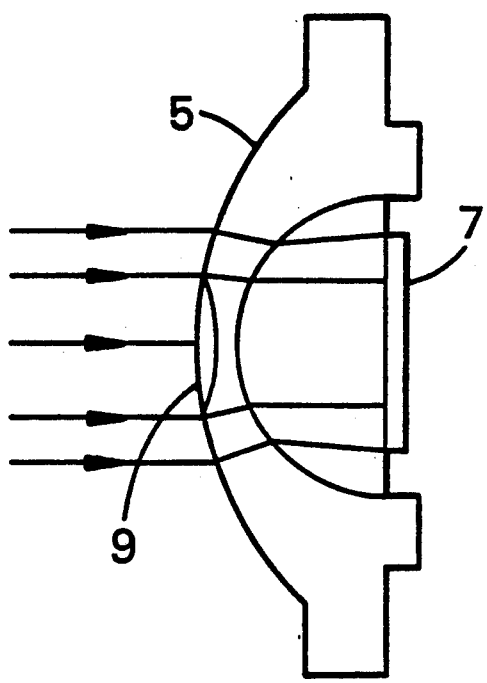
FIGS. 2a to 2c are diagrams showing the state of light rays incident upon the converging lens of the optical sensor shown in FIG. 1.
Figure 2C:
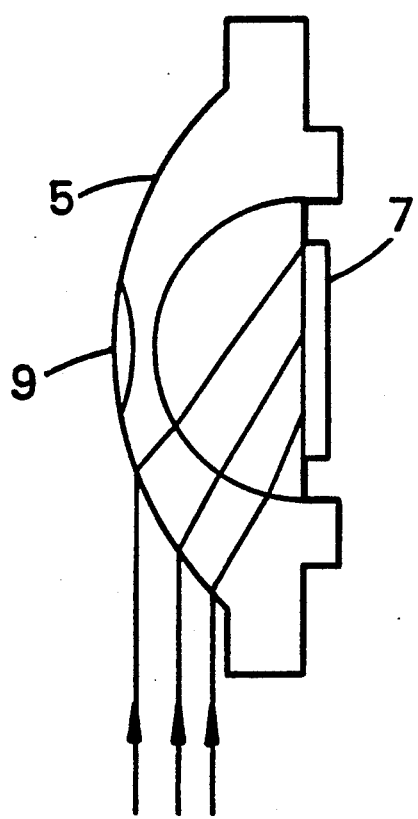
Figure 2B:
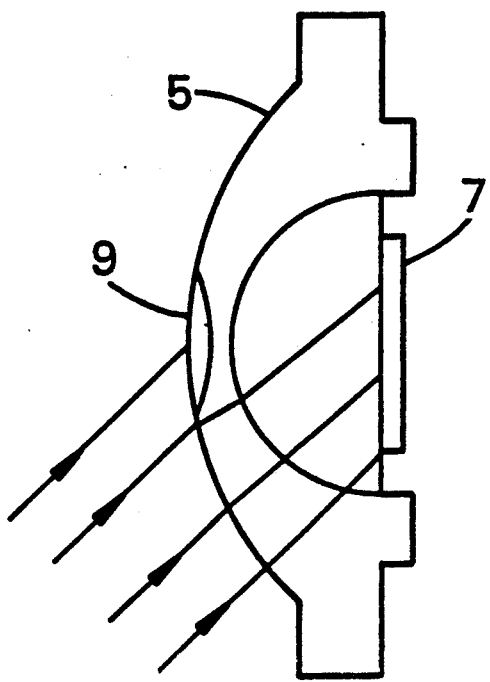

FIG. 1 shows an optical sensor of this invention, which comprises a converging lens 5, and a light detector 6 that is provided with a transmitting window 7 and an optical sensor element 8. A light ray shielding section 9 that has a configuration symmetrical with respect to the optical axis of the converging lens 5 is located on the optical axis of the converging lens 5. As shown in FIG. 2a, when the angles of incident are zero degrees, most of the light rays are shielded by the shielding section 9 and do not reach the transmitting window 7 of the light detector 6. As shown in FIG. 2b, on the other hand, a part of light rays with an incident angle of 45 degrees is shielded by the shielding section 9. Furthermore, when the angles of incidence are 90 degrees as shown in FIG. 2c, the light rays are refracted greatly on the light source side of the converging lens 5 and, consequently, most of the light rays reach the transmitting window 7 without passing through the shielding section 9. As a result, the amount of light rays with smaller incident angles to be detected becomes smaller and the amount of the light rays with greater incident angles to be detected becomes relatively greater. This means that the difference in the detected amount of light rays based on the different angles of incidence can be reduced.

EXAMPLE 2

Figure 3:
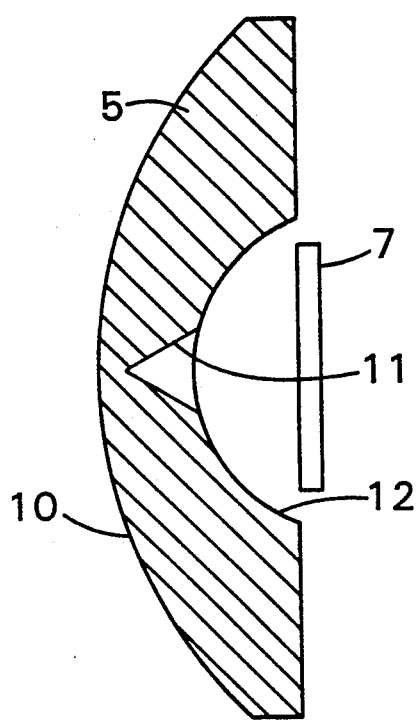
FIG. 3 is a cross sectional view showing the main part of the optical sensor of a second embodiment of this invention.

FIG. 3 shows the converging lens of another optical sensor of this invention, the converging lens 5 of this example is different from that of Example 1 as shown in FIG. 1, in that the entire converging lens 5 of this example is made of a single kind of material and is provided with a total reflection section 11, so that the effect which was attained by the converging lens with the shielding section of Example 1 can also be attained by this example. In FIG. 3, the reference numeral 10 is a surface of the converging lens facing a light source (not shown), 11 is a total reflection section formed in the surface of image forming side of the converging lens 5, and 12 is a spherical surface section on the image forming side of the converging lens 5. The converging lens 5 functions as follows: FIGS. 4a, 4b and 4c show light rays incident upon the transmitting window 7 at different incident angles. As shown in FIG. 4a, light rays with small incident angles are refracted by the total reflection section 11 and do not reach the transmitting window 7, and only the light rays passing through the spherical surface section 12 reach the transmitting window 7. Light rays with medium-sized or more angles of incidence, as shown in FIGS. 4b and 4c, most of the light rays, either incident upon the total reflection section 11 or upon the spherical surface section 12, reach the transmitting window 7. Moreover, because the light rays that reach the transmitting window 7 through the total reflection section 11 are incident upon the transmitting window 7 with incident angles smaller than those of the light rays that reach the transmitting window 7 through the spherical surface section 12, the detection efficiency of this optical sensor is improved. As a result, an optical sensor that has less dependence upon the incident angle can be provided using a monolithic lens of a simple structure made of a single material. Although this example discloses that one total reflection section 11 is provided at one portion of the optical axis of the converging lens 5, it can be located at a portion other than the optical axis or a plurality of total reflection sections can be provided at different positions.

EXAMPLE 3

Figure 5:
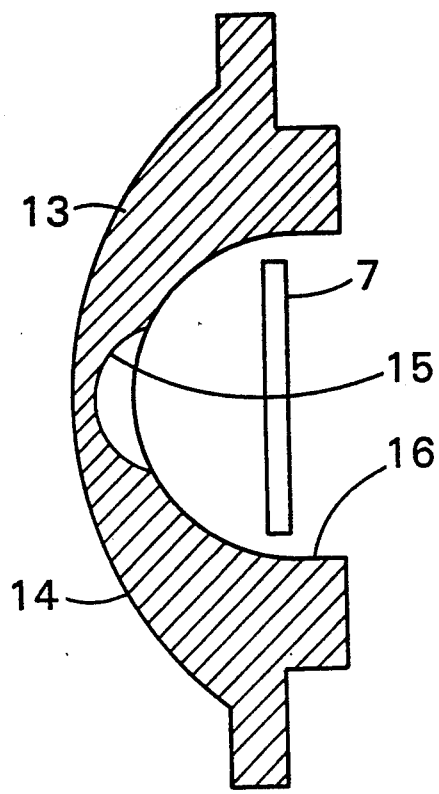
FIGS. 5 to 8, respectively are cross sectional views showing the main parts of the optical sensors of third to sixth embodiments of this invention.

FIG. 5 shows the converging lens of another optical sensor of this invention, wherein the reference numeral 13 is a converging lens, 14 is the light source side surface of the converging lens 13, 15 is a curved surface of the converging lens 13 on the image forming side, and 16 is an image forming side surface of the converging lens 13. The converging lens 13 functions as follows: Most of light rays with smaller incident angles to the converging lens 13 transmit through the surface 14 of the converging lens 13 on the light source side and the curved surface 15 of the converging lens 13 on the image forming side. The light source side surface 14 and the image plane side curved surface 15 form a concave lens of a small curvature, which causes incident light rays to spread over a large angle, thereby reducing the amount of light rays reaching the transmitting window 7. On the other hand, light rays with large incident angles are deflected greatly by the light source side surface 14 and the image forming side surface 16 of the converging lens 13 and reach the transmitting window 7 at small incident angles, thereby enabling efficient detection of the amount of light rays even when the absolute amount of light rays that enter into the transmitting window 7 is small.

EXAMPLE 4

Figure 6:
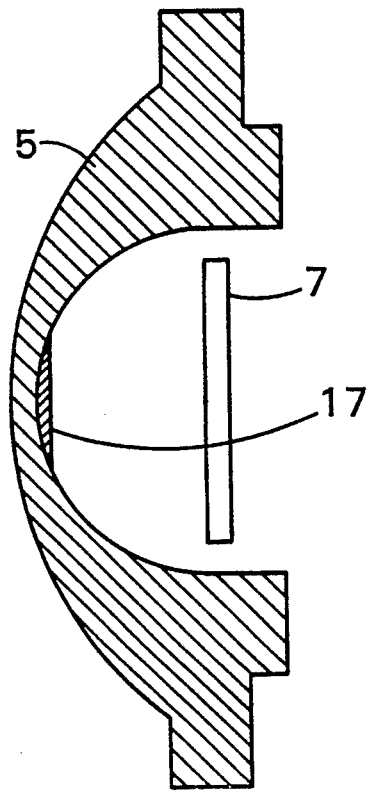

FIG. 6 shows another optical sensor of this invention, which is different from the optical sensor of Example 1 in that the light-shielding section 17 of this example is disposed on the surface of the converging lens 5 on the image forming side.

EXAMPLE 5

Figure 7:
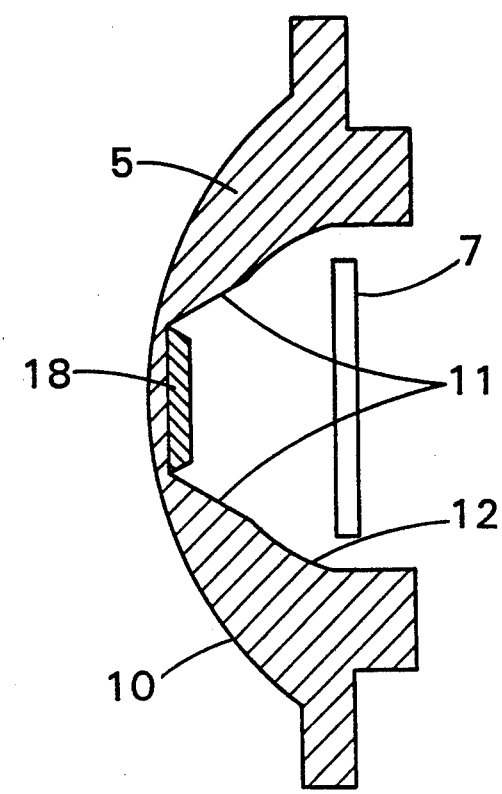

FIG. 7 shows another optical sensors of this invention, which is the same constitution as that of Example 2 shown in FIG. 3, except that a light-shielding section 18 is provided in addition to the total reflection section 11. A greater effect can be attained in this example than that of Example 2.

EXAMPLE 6

Figure 8:
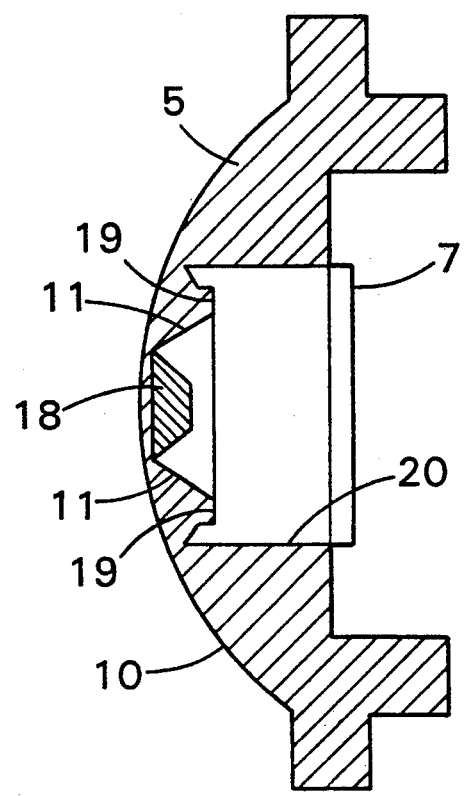

FIG. 8 shows another optical sensor of this invention, which is also the same constitution as that of Example 2 shown in FIG. 3, except that a light-shielding section 18 and a plane section 19 for directing light rays that enter into the converging lens 5 with small angles of incidence are provided in addition to the total reflection section 11. A greater effect can also be attained in this example than that of Example 2. The reference numeral 20 is a side face section formed of a plurality of surfaces without using a spherical surface, and the respective surfaces effectively direct the light rays of different incident angles onto the transmitting window 7.

EXAMPLE 7

Figure 9:
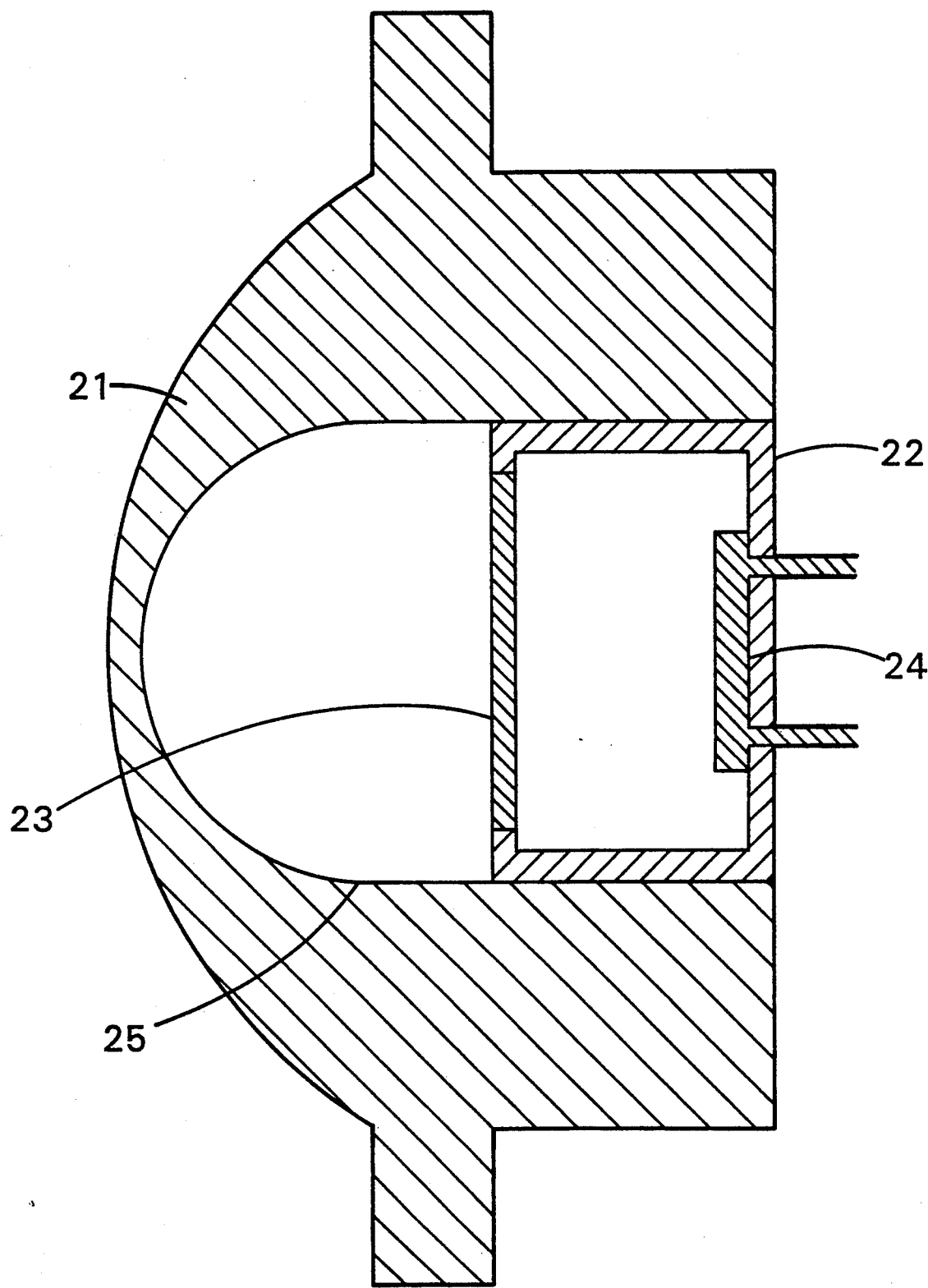
FIG. 9 is a cross sectional view showing the optical sensor of a seventh embodiment of this invention.
Figure 10:
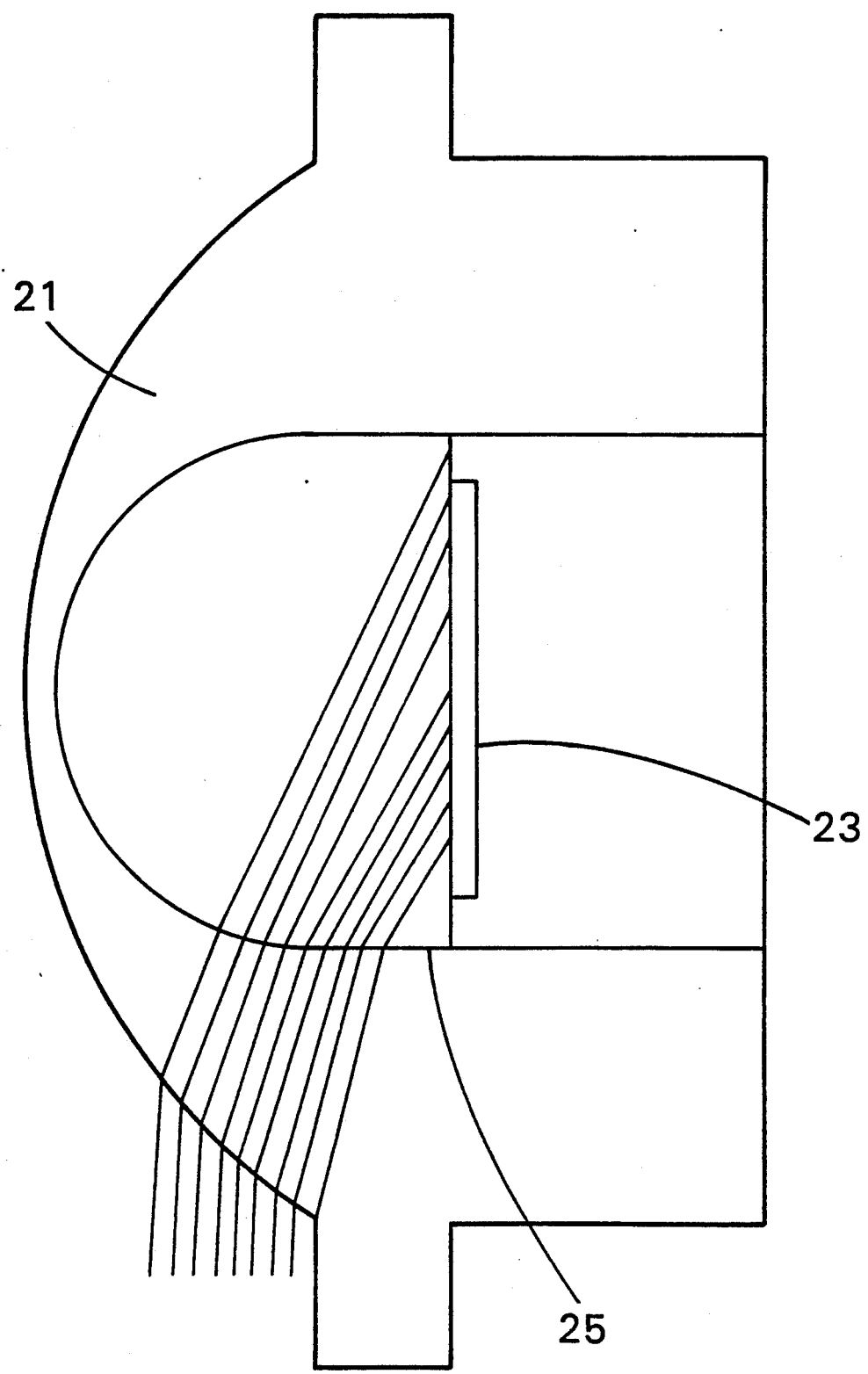
FIG. 10 is a diagram showing the state of light rays incident upon the converging lens of the optical sensor shown in FIG. 9.

FIG. 9 shows another optical sensor of this invention, which comprises a converging lens 21 and a light detector 22. The light detector 22 is provided with a transmitting window 23 and an optical sensor element 24. A cylindrical surface 25 which is substantially parallel to the optical axis of the converging lens 21 is located on the light detector 22 side of the converging lens 21. As shown in FIG. 10, when the incident angles are 90 degrees, the light rays are refracted by the cylindrical surface 25 of the converging lens 21 toward the direction in which the incident angles becomes smaller than those of the light rays entering into the converging lens 21. Accordingly, the light rays pass through the converging lens 21 with the angles of incidence smaller than those of light rays entering into the converging lens 21, so that the light rays passing through the converging lens and the transmitting window 23 with small angles of incidence can be effectively detected by the optical sensor element 24, and the amount of light rays to be detected become relatively large. That is, the difference in the amount of light rays to be detected due to incident angles can be reduced.

EXAMPLE 8

Figure 11:
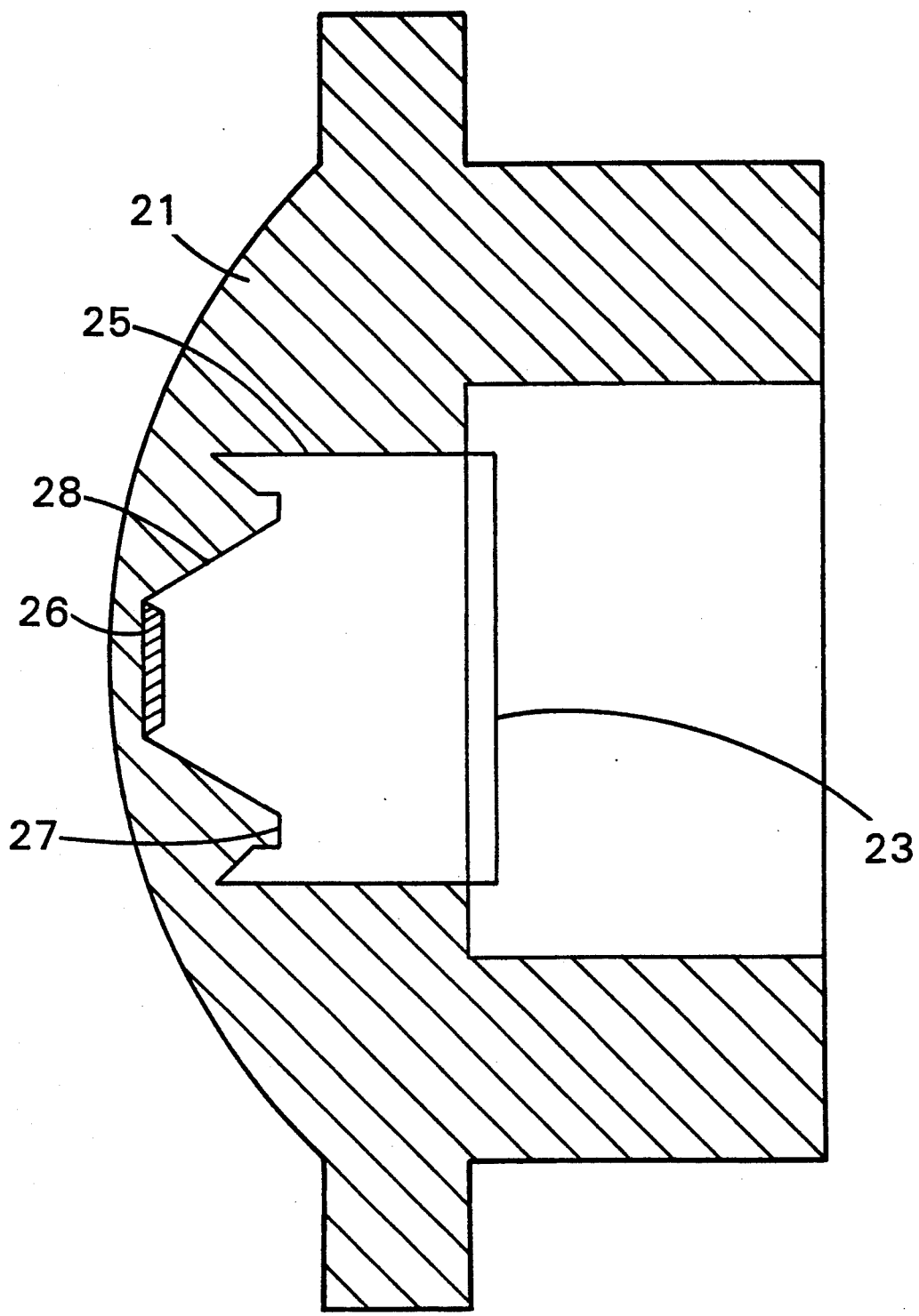
FIG. 11 is a cross sectional view showing the main part of the optical sensor of an eighth embodiment of this invention.

FIG. 11 shows the constitution of a converging lens of another optical sensor of this invention, which is different from the converging lens 21 of Example 7 shown in FIG. 9, in that a light-shielding means 26 which shields light rays of small incident angles and a total reflection surface 28 which totally reflects light rays of small incident angles are provided in the vicinity of the optical axis of the converging lens 21, thereby further reducing the difference in the amount of light rays to be detected due to incident angles. The reference numeral 25 is a cylindrical surface which is substantially parallel to the optical axis of the lens 21 and 27 is a surface perpendicular to the optical axis of the lens 21. Light rays entering into the converging lens 21 with small incident angles are shielded by the shielding means 26 and the total reflection surface 28. The surface 27 which is perpendicular to the optical axis of the lens 21 is provided so as to transmit light rays therethrough that enter into the converging lens 21 with small incident angles. The amount of light rays which reach the optical sensor element of the optical sensor can be freely set by adjusting the surface areas of the shielding means 26, the surface 27 perpendicular to the optical axis of the lens 21, and the total reflection surface 28.

Figure 12:
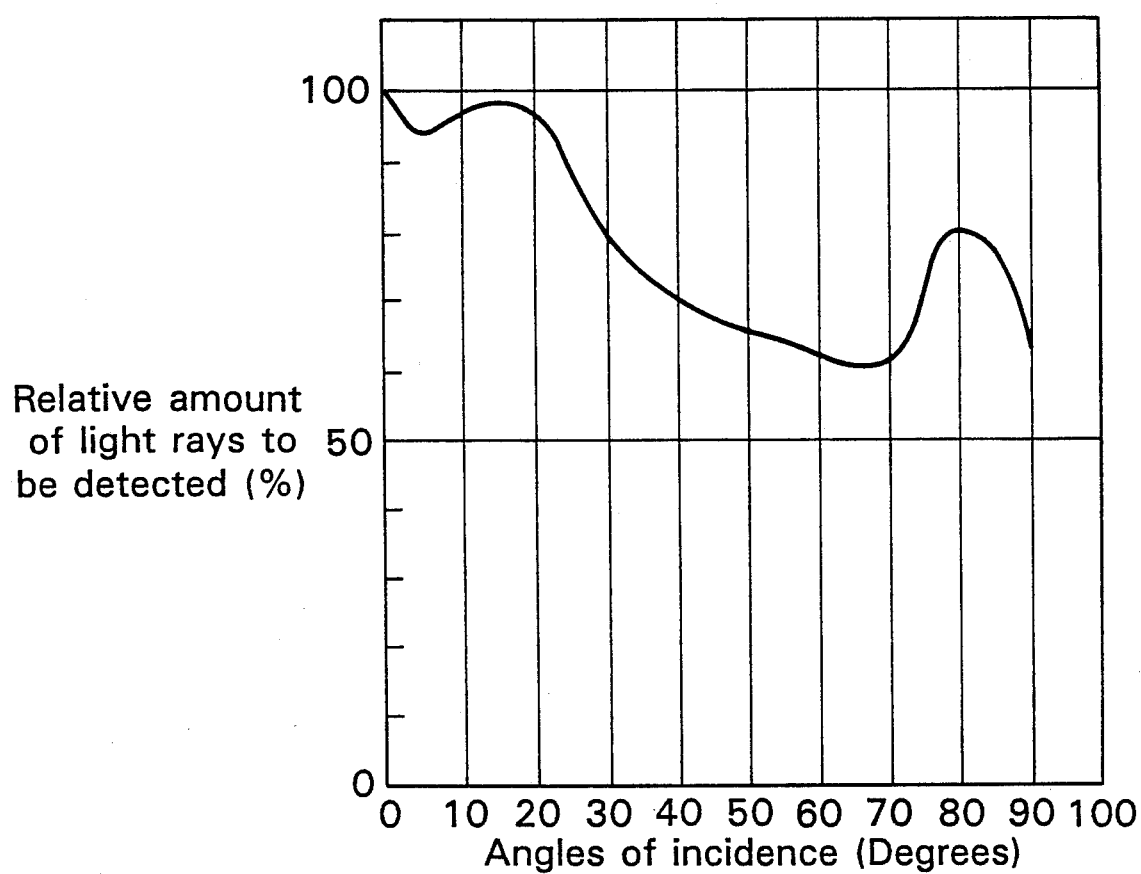
FIG. 12 is a graph showing the result of an experiment of measurements of light amounts in the eighth embodiment of this invention.

FIG. 12 shows the results of an experiment of measurements of light amounts by the use of the optical sensor of Example 8, wherein the maximum value of the amount of detected light rays is set to be 100.

FIG. 12 indicates that a nearly uniform amount of light rays is obtained for light rays with small incident angles, 40 degrees or less. Even the lowest amount of light rays detected is about 60% of the maximum value, which indicates a great improvement over conventional optical sensors.

Figure 13:
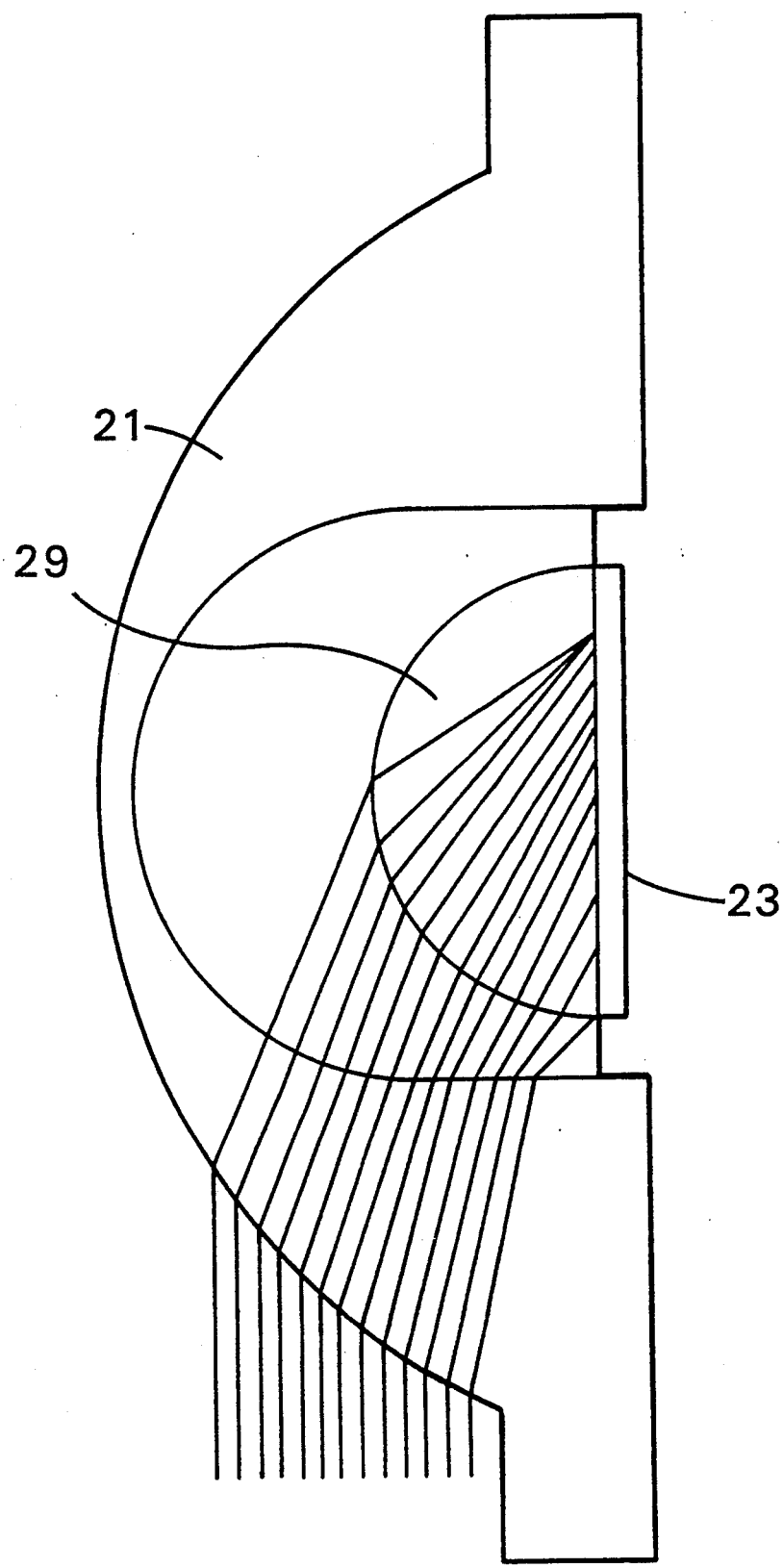
FIG. 13 is a cross sectional view showing the optical sensor of a ninth embodiment of this invention wherein two converging lenses are used.
Figure 14:
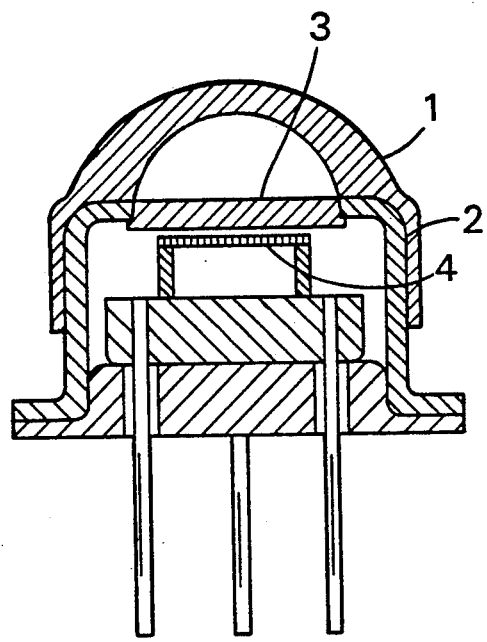
FIG. 14 is a cross sectional view showing a conventional optical sensor.
Figure 15:
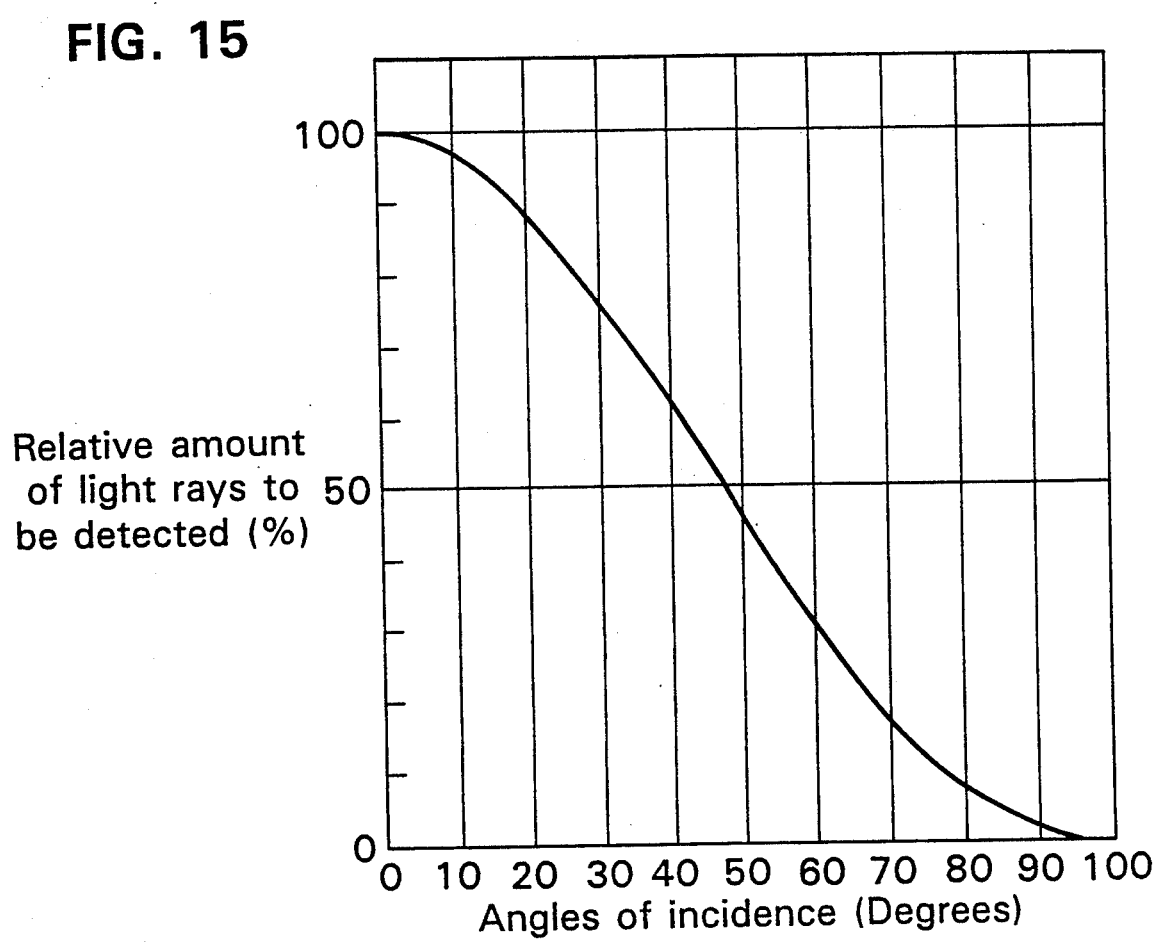
FIG. 15 is a graph showing the relationship between the light amounts and the incident angles in the optical sensor of FIG. 14.

Although a plane board that attains no lens effect was used as the transmitting window 23 in Examples 7 and 8, it can be a convex lens or, as shown in FIG. 13, it can be provided with a convex lens 29 as a second converging lens in front of it.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. An optical sensor comprising a light detector, a converging lens having an optical axis, said converging lens being located between said light detector and a light source, the light rays from which are detected by said light detector, and a light shielding means provided on a part of the converging lens in alignment with said optical axis thereof such that said shielding means shields only a center part of the light rays emitted from said light source.

2. An optical sensor according to claim 1, wherein a part of the converging lens has a total reflection surface which totally reflects light rays incident thereupon.

3. An optical sensor according to claim 1, wherein a total reflection surface or shielding section that shields light rays alone entering into said converging lens with specific angles of incidence is disposed in a part of said converging lens.

4. An optical sensor comprising a light detector, a converging lens having an optical axis, said converging lens being located between said light detector and a light source, the light rays from which are detected by said light detector, and a total reflection surface disposed in a part of said converging lens in alignment with said optical axis thereof such that said total reflection surface totally reflects only a center part of the light rays thereupon.

* * * * *